(12) United States Patent
Verbrugh et al.

(10) Patent No.: US 9,291,314 B2
(45) Date of Patent: Mar. 22, 2016

(54) LUMINAIRE EMITTING LIGHT OF DIFFERENT COLOURS

(75) Inventors: Stefan Marcus Verbrugh, Eindhoven (NL); Ralph Kurt, Eindhoven (NL); Marco Andreas Jacobus Van As, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 14/232,626

(22) PCT Filed: Jul. 12, 2012

(86) PCT No.: PCT/IB2012/053562
§ 371 (c)(1),
(2), (4) Date: Jan. 14, 2014

(87) PCT Pub. No.: WO2013/011427
PCT Pub. Date: Jan. 24, 2013

(65) Prior Publication Data
US 2014/0177218 A1 Jun. 26, 2014

Related U.S. Application Data

(60) Provisional application No. 61/508,193, filed on Jul. 15, 2011.

(51) Int. Cl.
*F21V 9/00* (2015.01)
*F21K 99/00* (2010.01)
(Continued)

(52) U.S. Cl.
CPC ... *F21K 9/56* (2013.01); *F21S 8/00* (2013.01); *F21V 7/04* (2013.01); *F21V 7/048* (2013.01);
(Continued)

(58) Field of Classification Search
CPC .............. F21K 9/50; F21K 9/56; F21K 9/52; F21K 9/54; F21K 9/05; F21K 9/58; F21Y 2101/02; F21Y 2113/005; G02B 27/14; G02B 27/18; G02B 27/62
USPC .......................................................... 362/231
See application file for complete search history.

(56) References Cited

U.S. PATENT DOCUMENTS 4,947,291 A * 8/1990 McDermott ............ F21L 4/025
359/490.02
6,200,002 B1 3/2001 Marshall et al.
(Continued)

FOREIGN PATENT DOCUMENTS

| EP | 1494062 A2 | 1/2005 |
|---|---|---|
| EP | 2320125 A1 | 5/2011 |
| WO | 2009016604 A1 | 2/2009 |
| WO | 2010029475 A1 | 3/2010 |
| WO | 2010146499 A1 | 12/2010 |

*Primary Examiner* — Ali Alavi
(74) *Attorney, Agent, or Firm* — Meenakshy Chakravorty

(57) ABSTRACT

The disclosed embodiments relate to a luminaire (100) comprising an array of LEDs (120). The array of LEDs (120) comprises LEDs chosen from the group of blue LED, green LED, red LED, yellow LED, amber LED, cyan LED, and white LED. The luminaire (100) further comprises a reflecting tube (140) and said array of LEDs (100) is arranged in an entrance aperture (142) of said reflecting tube (140). At least one light source (160) is arranged circumferentially around the reflecting tube (140). The at least one light source (160) comprises at least one LED chosen from the group of deep blue LEDs, royal blue LEDs, deep red LEDs and UV LEDs. An optical component (170), is arranged to transmit light emitted from the at least one light source (160) into light emitted from the array of LEDs (120).

14 Claims, 5 Drawing Sheets

(51) Int. Cl.
*F21S 8/00* (2006.01)
*F21V 7/04* (2006.01)
*G02B 27/14* (2006.01)
*F21Y 113/00* (2006.01)
*F21Y 101/02* (2006.01)
*F21Y 113/02* (2006.01)
*F21V 29/74* (2015.01)
*F21V 29/89* (2015.01)

(52) U.S. Cl.
CPC ............... *F21V 29/74* (2015.01); *F21V 29/89* (2015.01); *F21Y 2101/02* (2013.01); *F21Y 2113/005* (2013.01); *F21Y 2113/02* (2013.01); *G02B 27/14* (2013.01)

(56) References Cited

U.S. PATENT DOCUMENTS

| | | | |
|---|---|---|---|
| 7,559,664 | B1 | 7/2009 | Walleman et al. |
| 8,408,725 | B1 * | 4/2013 | Maxik ................. F21V 9/16 362/551 |
| 9,173,269 | B2 * | 10/2015 | Maxik ............... H05B 33/0869 |
| 2005/0179873 | A1 | 8/2005 | Futoshi et al. |
| 2006/0114423 | A1 | 6/2006 | Makoto et al. |
| 2006/0126178 | A1 | 6/2006 | Li |
| 2006/0239006 | A1 | 10/2006 | Chaves et al. |

* cited by examiner

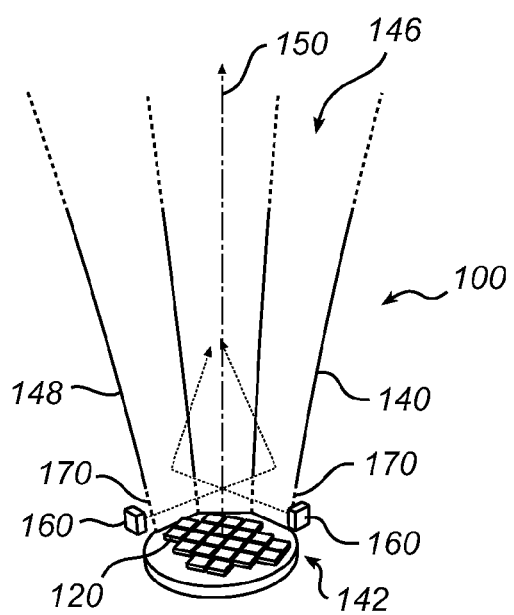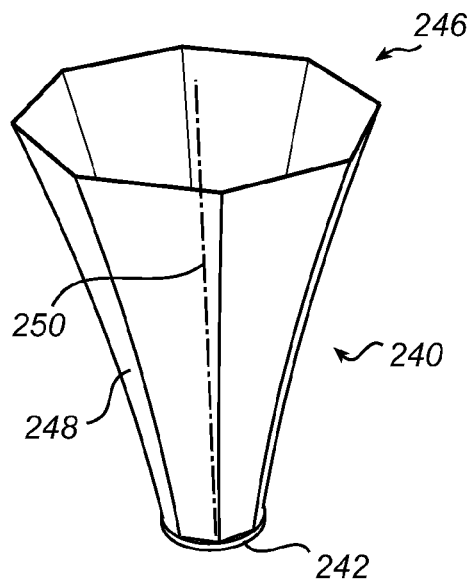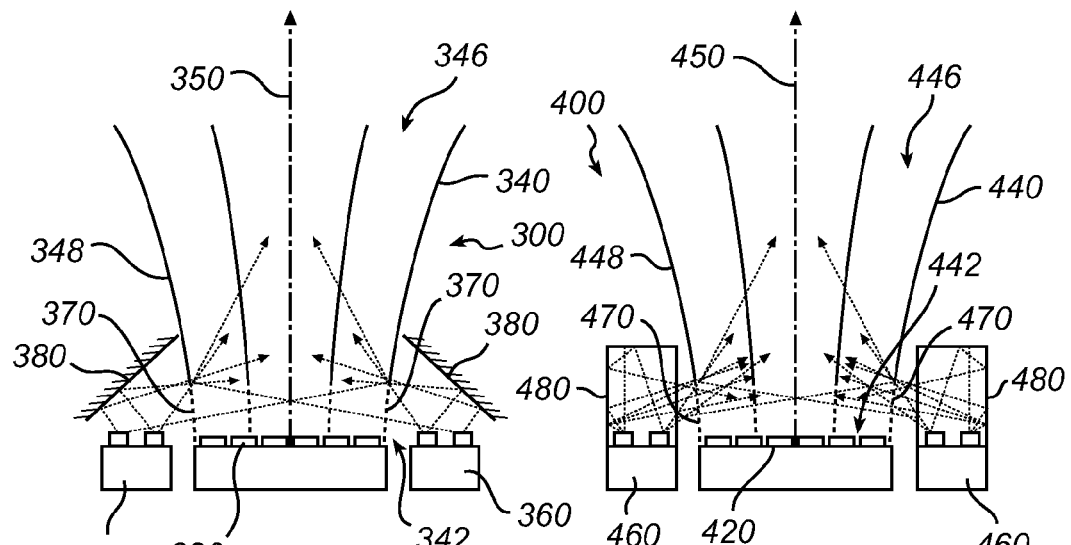

LUMINAIRE EMITTING LIGHT OF DIFFERENT COLOURS

FIELD OF THE INVENTION

The present invention relates to the field of luminaires, more particularly to a luminaire comprising an array of LEDs comprising at least one from the group of blue LED, green LED, red LED, yellow LED, amber LED, cyan LED, and white LED.

BACKGROUND OF THE INVENTION

Colored light is used in many applications where scene setting and atmosphere creation is important. Examples of applications are theatre lighting, architecture lighting (city beautification), shops, and hospitality (hotels, restaurants). Today this is mostly accomplished by combining white light sources with colored filters.

As an alternative, systems with multicolored LEDs (Light Emitting Diodes) can be used. They are attractive because they generate the colors without filters. This has an efficiency advantage and, more importantly, colors can be changed by the electronics: there is no need to change filters to change color, all colors are always available. The market for these systems is quickly growing as LED performance improves. A drawback is that it is difficult to obtain a light spectrum that imitates the light spectrum emitted from halogen lamps.

SUMMARY OF THE INVENTION

It is an object of the present invention to overcome or alleviate problems of the prior art.

According to a first aspect of the invention, this and other objects are achieved by a luminaire comprising an array of LEDs comprising at least one from the group of blue LED, green LED, red LED, yellow LED, amber LED, cyan LED, and white LED, a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs, at least one light source arranged circumferentially around said reflecting tube, wherein the at least one light source comprises at least one LED chosen from the group of deep blue LEDs, royal blue LEDs, deep red LEDs and UV LEDs, and at least one optical component arranged to transmit light emitted from the at least one light source into light emitted from the array of LEDs.

This is advantageous in that the color quality of the emitted light spectrum is improved due to the large amount of LEDs emitting light at different wavelengths. Furthermore, more LEDs can be used since not all LEDs must be arranged in the entrance aperture but some of them can be arranged circumferentially around the reflecting tube. More LEDs results in a larger output of light. Less LEDs in the limited area inside the entrance aperture results in less generated heat inside the reflecting tube. Moreover, mixing of the different light is achieved which results in a homogenous light distribution and reduced risk of color shadows. The source of light being relatively small, due to the compact design, results in a well defined beam which implies that the luminaire can be used in, e.g., profile spots.

Said optical component may be an X-cube arranged at the exit aperture such that light emitted from the at least one light source is directed into light emitted from the array of LEDs. This is advantageous in that an even more homogenous light distribution is achieved.

Said optical component may be a dichroic mirror which is integral in said wall, transparent to light emitted from the at least one light source and reflective to light emitted from said array of LEDs. This is advantageous in that an even more homogenous light distribution is achieved.

The dichroic mirror may be arranged closer to the entrance aperture than to the exit aperture. This is advantageous in that a better light mixing and more homogeneous light distribution is achieved.

The at least one light source may be arranged in a mixing box. This is advantageous in that the light emitted from the light source is mixed even better Light emitted from the at least one light source may be directed to the at least one dichroic mirror via a mirror. This is advantageous in that the at least one light source can be arranged in the same plane as said array of LEDs.

Said at least one optical component may be a light guide having an entrance aperture and an exit aperture, wherein the entrance aperture is coupled to the at least one light source, wherein the exit aperture of the light guide is a dichroic mirror which is transparent to light emitted from the at least one light source and reflective to light emitted from said array of LEDs, and wherein the exit aperture of the light guide is integral in said wall. This is advantageous in that the at least one light source may be arranged at a distance from the reflecting tube without experiencing a substantial loss in the amount of light emitted from the at least one light source.

Said at least one optical component may be a light guide having an entrance aperture and an exit aperture, wherein the entrance aperture is coupled to the at least one light source, and wherein the exit aperture is arranged in said array of LEDs. This is advantageous in that the at least one light source may be arranged at a distance from the reflecting tube without experiencing a substantial loss in the amount of light emitted from the at least one light source.

The circumferential wall may be at least one from the group of specularly reflective, and diffusively reflective. This is advantageous in that the distribution of the light can be made more uniform in terms of brightness.

Said circumferential wall, seen from said optic axis, may have a convex shape. This is advantageous in that a better mixing of the light is achieved.

Said array of LEDs and said at least one light source may be arranged on separate PCBs (Printed Circuit Boards). This is advantageous in that the at least one light source may be kept at a lower temperature which may improve the efficiency of the at least one light source.

LEDs arranged at the separate PCBs may be comprised of InGaN LEDs or AlInGaP LEDs. InGaN LEDs can be operated at higher junction temperatures than AlInGaP LEDs. If the two are on the same PCB, both types will have temperatures that are about equal and hence the InGaN LEDs are not used at their maximum power. Putting them on separate PCBs enables driving the InGaN LEDs harder than the AlInGaP LEDs. It is an intrinsic property of AlInGaP that the maximum operational temperature is lower than InGaN. Thus temperature of InGaN LEDs can be higher which results in more power and more emitted light. At the same time the temperature of the AlInGAaP can be kept at a lower temperature which improves the efficiency of, e.g., red, amber, and deep red LEDs.

The at least one optical component may have a transition from reflective to transmissive between 550 and 590 nm. InGan LEDs exist in various overlapping wavelengths, but are not efficient at wavelengths above 550 nm. AlInGaP LEDs also exist in various overlapping wavelengths, but are not efficient below 590 nm. This means that there will be a gap in the spectrum, unless phosphors are used. The optical component, e.g., a dichroic mirror and/or X-cube, also introduces a wavelength range where the reflection and transmission are not perfect (transition from reflective to transmissive). Thus, it is advantageous to design dichroic mirrors such that these two ranges coincide. It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention in which, FIG. 1 is a perspective view of a schematic illustration of an embodiment of the inventive luminaire.

FIG. 2 is a perspective view an embodiment of a reflector used in the inventive luminaire.

FIG. 3 is a side view of a schematic illustration of an embodiment of the inventive luminaire.

FIG. 4 is a side view of a schematic illustration of an embodiment of the inventive luminaire.

DETAILED DESCRIPTION

Figure 5:
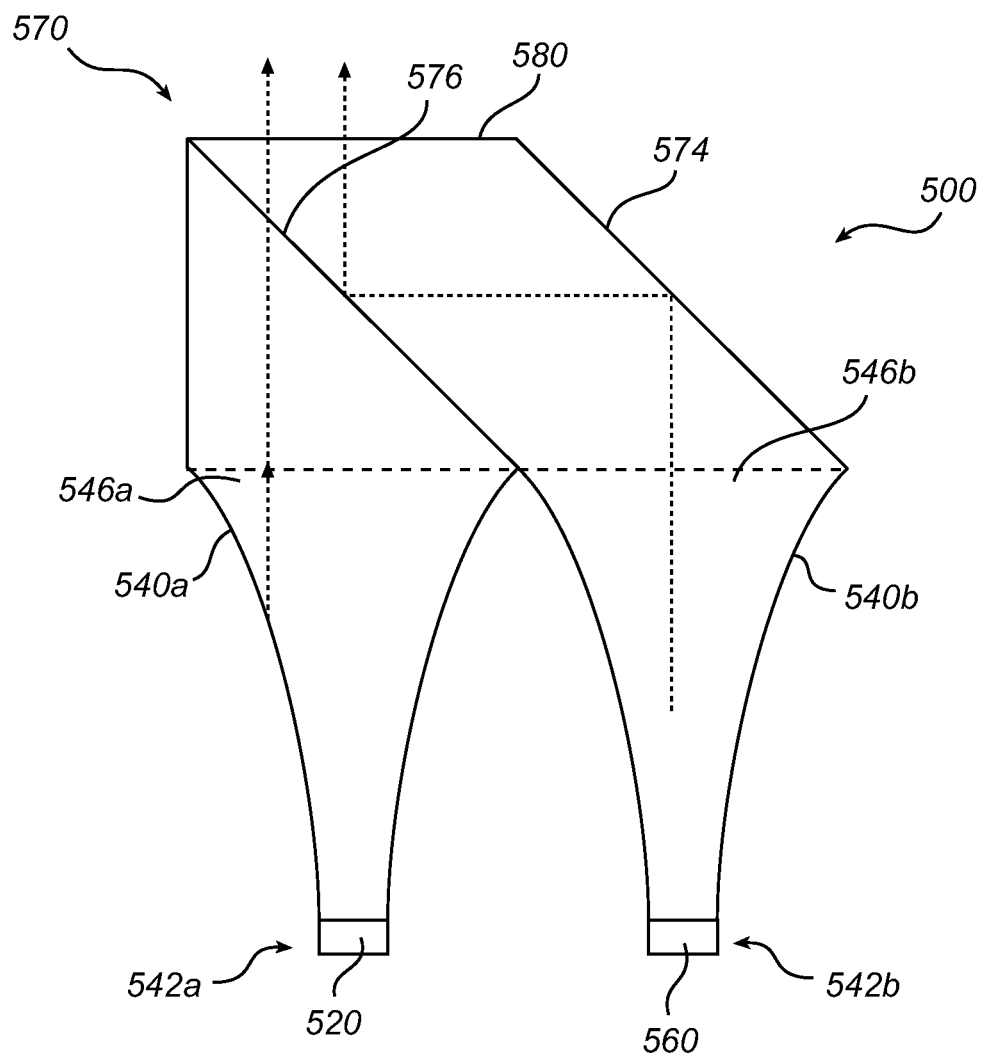
FIG. 5 is a side view of a schematic illustration of an embodiment of the inventive luminaire.

FIG. 1 is a perspective view of a schematic illustration of an embodiment of the inventive luminaire. The luminaire 100 comprises an array of LEDs 120 comprising at least one from the group of blue LED, green LED, red LED, yellow LED, amber LED, cyan LED, and white LED. The luminaire 100 further comprises a reflecting tube 140 having an entrance aperture 142, an exit aperture 146, a reflective circumferential wall 148 extending between said apertures 142, 146, and an optic axis 150 extending between said apertures 142, 146 centrally of said wall 148. The array of LEDs 120 is arranged in the entrance aperture 142. The circumferential wall 148 is arranged to reflect and mix light from the array of LEDs 120.

Two light sources 160 are arranged opposite to each other circumferentially around the reflecting tube 140. The light sources 160 each comprise one LED chosen from the group of deep blue LEDs, royal blue LEDs, deep red LEDs and UV LEDs.

A wavelength of the light emitted from the UV LEDs may be in the range between 300 nm and 500 nm, preferably between 340 nm and 450 nm, most preferably between 360 and 410 nm.

A wavelength of the light emitted from the deep red LEDs may be in the range between 640 nm and 750 nm, preferably between 650 nm and 700 nm, most preferably between 660 and 690 nm.

A wavelength of the light emitted from the deep blue LEDs may be in the range between 400 nm and 470 nm, preferably between 420 nm and 460 nm, most preferably between 430 and 450 nm.

Two optical components 170 are arranged to transmit light emitted from the light sources 160 into light emitted from the array of LEDs 120. The optical components 170 are arranged at the same height as the light sources 160 in relation to the optical axis 150. In this embodiment, the optical components 170 are two dichroic mirrors which are transparent to light emitted from the light sources 160 and reflective to light emitted from the array of LEDs 120. More specifically, the dichroic mirrors may be transmissive to light emitted from the light sources 160 that is incident at a small angle of in relation to a surface normal of the dichroic mirrors and reflective to light emitted from the array of LEDs 120 that is incident at a large angle in relation to a surface normal of the dichroic mirrors. The light sources 160 may have optical elements to collimate the light emitted from the light sources 160. The light sources 160 are positioned so that light emitted from the light sources 160 is incident on the dichroic mirrors 170. As is illustrated in FIG. 1, the dichroic mirrors 170 are arranged closer to the entrance aperture 142 than to the exit aperture 146.

FIG. 2 is a perspective view of an embodiment of a reflector used in the inventive luminaire. The reflecting tube 240 comprises a reflective circumferential wall 248 extending between the entrance aperture 242 and the exit aperture 246. As is evident from FIG. 2, the circumferential wall 248 diverges from the entrance aperture 242 to the exit aperture 246. The circumferential wall 248, seen from said optic axis 250, has a convex shape. The circumferential wall 248 can be at least one from the group of specularly reflective, and diffusively reflective. Furthermore, the circumferential wall of the reflecting tube can be segmented. It is to be noted that the reflecting tube 240 can be used in the embodiments of FIGS. 1, and 3-8.

FIG. 3 is a side view of a schematic illustration of an embodiment of the inventive luminaire. FIG. 3 discloses a luminaire 300 comprising an array of LEDs 320 comprising at least one from the group of blue LED, green LED, red LED, yellow LED, amber LED, cyan LED, and white LED. The luminaire 300 further comprises a reflecting tube 340 having an entrance aperture 342, an exit aperture 346, a reflective circumferential wall 348 extending between said apertures 342, 346, and an optic axis 350 extending between said apertures 342, 346 centrally of said wall 348. The array of LEDs 320 is arranged in the entrance aperture 342. The circumferential wall 348 is arranged to reflect and mix light from the array of LEDs 320.

Two light sources 360 are arranged opposite to each other circumferentially around the reflecting tube 340. The light sources 360 comprise two LEDs each wherein at least one LED is chosen from the group of deep blue LEDs, royal blue LEDs, deep red LEDs and UV LEDs. The wavelength ranges described in connection with FIG. 1 are applicable here as well. The light sources 360 are arranged next to the array of LEDs 320. The light sources 360 are arranged in relation to the array of LEDs 320 such that light emitted from the light sources 360 is generally directed in the same direction as light emitted from the array of LEDs 320. Therefore, two mirrors 380 are arranged to direct the light emitted from the light sources 360 towards the dichroic mirrors 370.

Two optical components 370 are arranged to transmit light emitted from the light sources 360 into light emitted from the array of LEDs 320. In this embodiment, the optical components 370 are two dichroic mirrors which are transparent to light emitted from the light sources 360 and reflective to light emitted from the array of LEDs 320. As is illustrated in FIG. 3, the dichroic mirrors 370 are arranged closer to the entrance aperture 342 than to the exit aperture 346.

FIG. 4 is a side view of a schematic illustration of an embodiment of the inventive luminaire. FIG. 4 discloses a luminaire 400 comprising an array of LEDs 420 comprising at least one from the group of blue LED, green LED, red LED, yellow LED, amber LED, cyan LED, and white LED. The luminaire 400 further comprises a reflecting tube 440 having an entrance aperture 442, an exit aperture 446, a reflective circumferential wall 448 extending between said apertures 442, 446, and an optic axis 450 extending between said apertures 442, 446 centrally of said wall 448. The array of LEDs 420 is arranged in the entrance aperture 442. The circumferential wall 448 is arranged to reflect and mix light from the array of LEDs 420.

Two light sources 460 are arranged opposite to each other circumferentially around the reflecting tube 440. The light sources 460 comprise two LEDs each wherein at least one LED is chosen from the group of deep blue LEDs, royal blue LEDs, deep red LEDs and UV LEDs. The wavelength ranges described in connection with FIG. 1 are applicable here as well. The light sources 460 are arranged next to the array of LEDs 420. The light sources 460 are arranged in relation to the array of LEDs 420 such that light emitted from the light sources 460 is generally directed in the same direction as light emitted from the array of LEDs 420.

Two optical components 470 are arranged to transmit light emitted from the light sources 460 into light emitted from the array of LEDs 420. In this embodiment, the optical components 470 are two dichroic mirrors which are transparent to light emitted from the light sources 460 and reflective to light emitted from the array of LEDs 320. Preferably, the dichroic mirrors are transparent, at a wide angular range, to light emitted from the light sources 460. The light sources 460 are each arranged in a mixing box 480. A mixing box is generally also referred to as a diffuse (white) chamber. The mixing boxes 480 are arranged to direct light from the light sources 460 towards the dichroic mirrors 470. Light emitted from the light sources 480 that is incident on a wall of the mixing boxes 480 that is next to the dichroic mirrors 470 is transmitted. Light emitted from the light sources 480 that is incident on any of the other walls of the mixing boxes 480 is reflected.

As is illustrated in FIG. 4, the dichroic mirrors 470 are arranged closer to the entrance aperture 442 than to the exit aperture 446.

FIG. 5 is a side view of a schematic illustration of an embodiment of the inventive luminaire. The luminaire 500 comprises two reflecting tubes 540a and 540b. In the entrance aperture 542a of reflecting tube 540a is an array of LEDs 520 arranged comprising at least one from the group of blue LED, green LED, red LED, yellow LED, amber LED, cyan LED, and white LED. In the entrance aperture 542b of reflecting tube 540b is at least one light source 560 arranged comprising at least one LED wherein the at least one LED is chosen from the group of deep blue LEDs, royal blue LEDs, deep red LEDs and UV LEDs. The wavelength ranges described in connection with FIG. 1 are applicable here as well.

An X-cube 570 is arranged at the exit apertures 546a and 546b of the reflecting tubes 540a and 540b. An X-cube is a cross dichroic prism and is a combination of four triangular prisms. It functions to combine a plurality of color beams. The broken lines in the X-cube 570 are diffusers arranged at the exit apertures 546a and b. As an alternative, a diffuser (not shown) can be arranged at the exit aperture 580 of the luminaire 500.

Light emitted from the array of LEDs 520 is, via the reflecting tube 540a, collimated and directed towards the X-cube 570. The dichroic mirror 576 is substantially transparent to light emitted from the array of LEDs 520 and reflective to light emitted from the at least one light source 560. Thus, light emitted from the array of LEDs 520 continues through the dichroic mirror 576 and exits as a collimated beam.

Light emitted from the at least one light source 560 is, via the reflecting tube 540b, collimated and directed towards the X-cube 570. All-wavelength reflector 574 reflects the light and directs it towards the dichroic mirror 576. The dichroic mirror 576 reflects the light and the light exits as a collimated beam.

Figure 6:
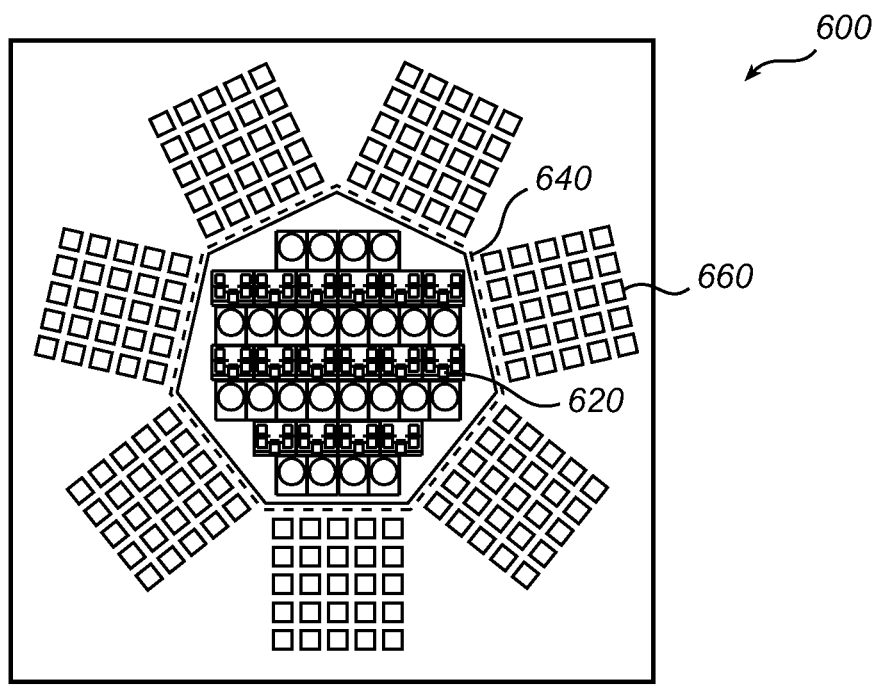
FIG. 6 is a top view of a schematic illustration of an embodiment of the inventive luminaire.

FIG. 6 is a top view of a schematic illustration of an embodiment of the inventive luminaire. A plurality of light sources 660 each comprising a plurality of LEDs chosen from the group of deep blue LEDs, royal blue LEDs, deep red LEDs and UV LEDs are circumferentially arranged around the reflecting tube 640 in which an array of LEDs 620 is arranged. The array of LEDs 620 comprises at least one from the group of blue LED, green LED, red LED, yellow LED, amber LED, cyan LED, and white LED. It is to be noted that the embodiment of FIGS. 1, 3, and 4 can equally well be embodied as having a plurality of light sources, as is illustrated in FIG. 6.

Figure 7:
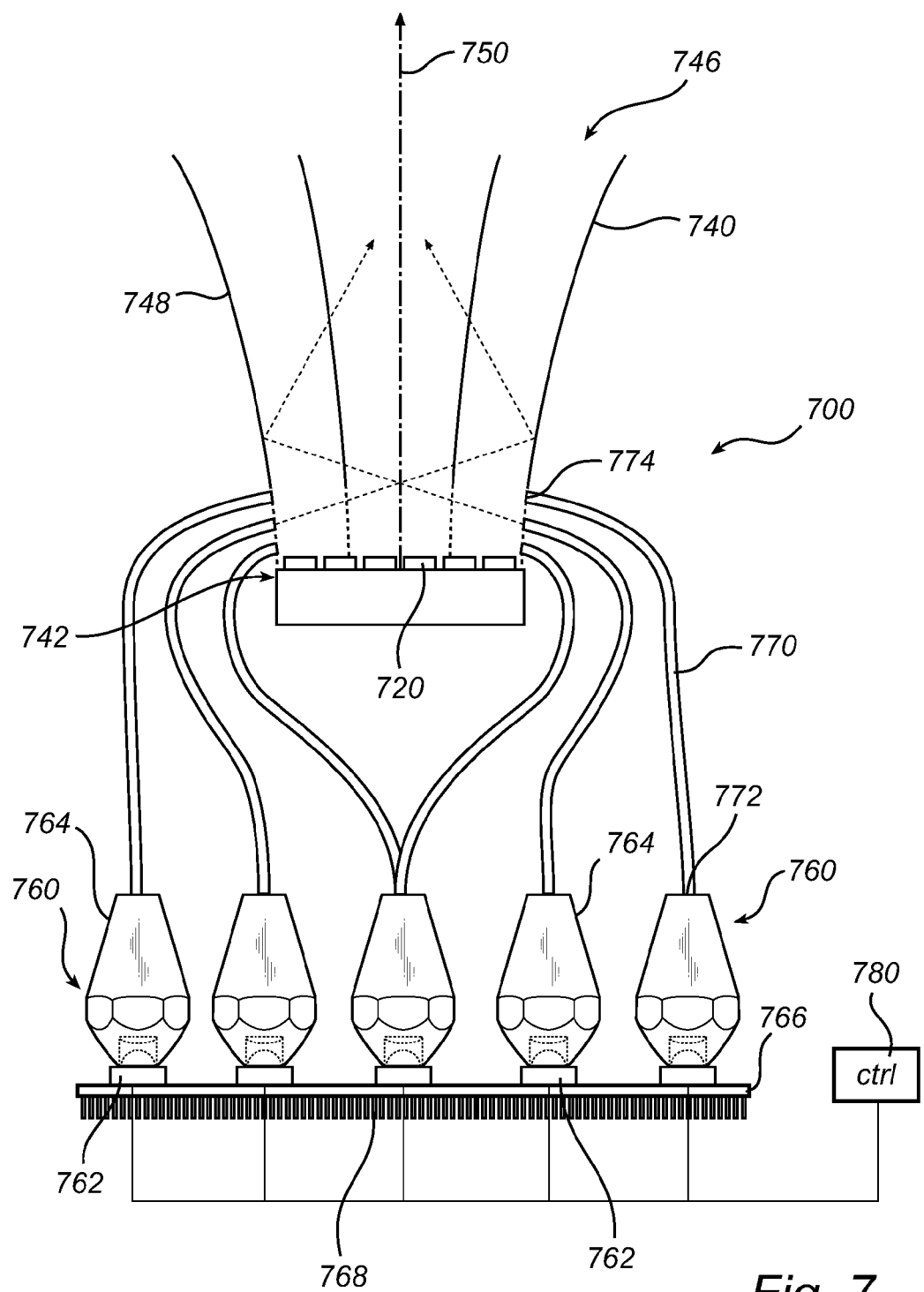
FIG. 7 is a side view of a schematic illustration of an embodiment of the inventive luminaire.

FIG. 7 is a side view of a schematic illustration of an embodiment of the inventive luminaire. FIG. 7 discloses a luminaire 700 comprising an array of LEDs 720 comprising at least one from the group of blue LED, green LED, red LED, yellow LED, amber LED, cyan LED, and white LED. The luminaire 700 further comprises a reflecting tube 740 having an entrance aperture 742, an exit aperture 746, a reflective circumferential wall 748 extending between said apertures 742, 746, and an optic axis 750 extending between said apertures 742, 746 centrally of said wall 748. The array of LEDs 720 is arranged in the entrance aperture 742. The circumferential wall 748 is arranged to reflect and mix light from the array of LEDs 720.

A plurality of light sources 760 are arranged circumferentially around the reflecting tube 740. The light sources 760 comprise at least one LED 762 which is chosen from the group of deep blue LEDs, royal blue LEDs, deep red LEDs and UV LEDs. The wavelength ranges described in connection with FIG. 1 are applicable here as well. The LEDs 762 are arranged on a substrate 766. The substrate 766 is provided with circuitry (not shown) for providing power and any control signals to the LEDs 762, and also a heat sink 768 to which the LEDs 762 are thermally connected. The heat sink 768 is adapted to dissipate heat generated by the LED 762. In the illustrated case the heat sink 768 is formed by relatively thin aluminum cooling fins, arranged on the back side of the substrate 766.

The light sources 760 further comprise a plurality of collimators 764 arranged on top of each LED 762. Each collimator 760 is arranged to collimate light from the corresponding LED 762 into a suitable angular range, typically less than ±30°, and a suitable area, typically with a diameter of a few mm. As an example, the collimator may be single cell LED concentrator lens. Such concentrator lenses suitable for standard LEDs are readily available, e.g. from Polymer Optics.

The optical components 770 are in this embodiment embodied as flexible optical wave guides, such as optical fibers. The light guides 770 each have an entrance aperture 772 and an exit aperture 774. The exit aperture 774 is a dichroic mirror which is transparent to light emitted from the light sources 760 and reflective to light emitted from said array of LEDs 720. The exit aperture 774 is integral in said wall 748. The entrance aperture 772 is coupled to the at least one light source 760. According to the present invention, the area of the substrate 766 occupied by LEDs 762 may be larger than the exit aperture 774. In other words, the light guides 770 collect light from a larger area and concentrate it into the smaller area of the exit aperture 774. A color controller 850 may be arranged to control the color mix of the luminaire 700.

Figure 8:
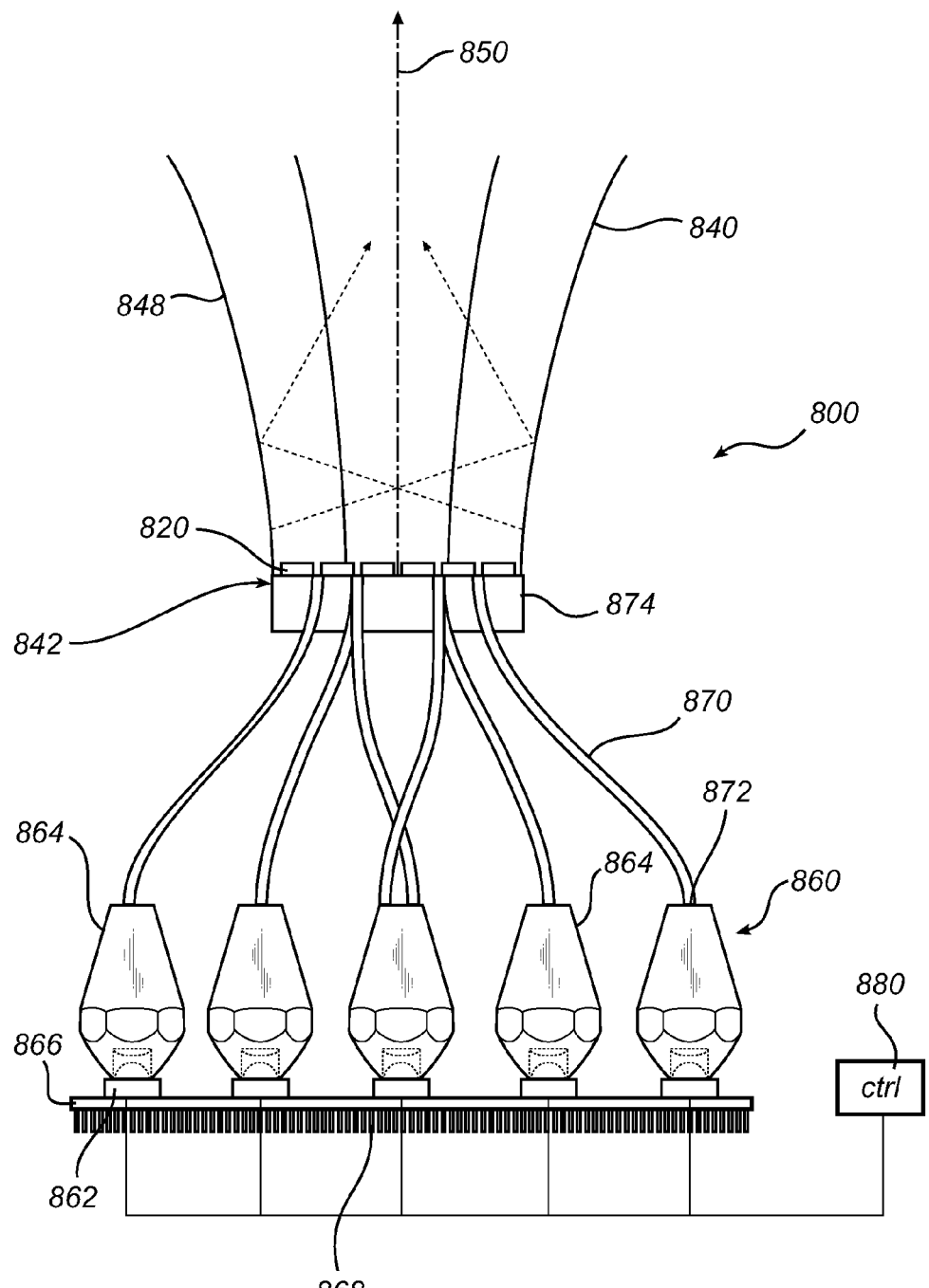
FIG. 8 is a side view of a schematic illustration of an embodiment of the inventive luminaire.

FIG. 8 is a side view of a schematic illustration of an embodiment of the inventive luminaire. FIG. 8 discloses a luminaire 800 comprising an array of LEDs 820 comprising at least one from the group of blue LED, green LED, red LED, yellow LED, amber LED, cyan LED, and white LED. The luminaire 800 further comprises a reflecting tube 840 having an entrance aperture 842, an exit aperture 846, a reflective circumferential wall 848 extending between said apertures 842, 846, and an optic axis 850 extending between said apertures 842, 846 centrally of said wall 848. The array of LEDs 820 is arranged in the entrance aperture 842. The circumferential wall 848 is arranged to reflect and mix light from the array of LEDs 820.

A plurality of light sources 860 are arranged circumferentially around the reflecting tube 840. The light sources 860 comprise at least one LED 862 which is chosen from the group of deep blue LEDs, royal blue LEDs, deep red LEDs and UV LEDs. The wavelength ranges described in connection with FIG. 1 are applicable here as well. The LEDs 862 are arranged on a substrate 866. The substrate 866 is provided with circuitry (not shown) for providing power and any control signals to the LEDs 862, and also a heat sink 868 to which the LEDs 862 are thermally connected. The heat sink 868 is adapted to dissipate heat generated by the LEDs 862. In the illustrated case the heat sink 868 is formed by relatively thin aluminum cooling fins, arranged on the back side of the substrate 866.

The light sources 860 further comprise a plurality of collimators 864 arranged on top of each LED 862. Each collimator 860 is arranged to collimate light from the corresponding LED 862 into a suitable angular range, typically less than ±30°, and a suitable area, typically with a diameter of a few mm. As an example, the collimator may be single cell LED concentrator lens. Such concentrator lenses suitable for standard LEDs are readily available, e.g. from Polymer Optics.

The optical components 870 are in this embodiment embodied as flexible optical wave guides, such as optical fibers. The light guides 870 each have an entrance aperture 872 and an exit aperture 874. The entrance aperture 872 is coupled to the at least one light source 860. The exit aperture 874 is arranged in said array of LEDs 820.

According to the present invention, the area of the substrate 866 occupied by LEDs 862 may be larger than the exit aperture 874. In other words, the light guides 870 collect light from a larger area and concentrate it into the smaller area of the exit aperture 874. A color controller 850 may be arranged to control the color mix of the luminaire 700.

As is evident from FIGS. 1 and 3-8, the array of LEDs 120, 320, 420, 520, 620, 720, 820 and the at least one light source 160, 360, 460, 560, 660, 760, 860 are arranged on separate PCBs. The LEDs that are arranged at the separate PCBs can be comprised of InGaN LEDs or AlInGaP LEDs. The at least one optical component 170, 370, 470, 570, 770 can have a transition from reflective to transmissive between 550 and 590 nm.

In summary, the disclosed embodiments relate to a luminaire comprising an array of LEDs. The array of LEDs comprises LEDs chosen from the group of blue LED, green LED, red LED, yellow LED, amber LED, cyan LED, and white LED. The luminaire further comprises a reflecting tube and said array of LEDs is arranged in an entrance aperture of said reflecting tube. At least one light source is arranged circumferentially around the reflecting tube. The at least one light source comprises at least one LED chosen from the group of deep blue LEDs, royal blue LEDs, deep red LEDs and UV LEDs. An optical component, is arranged to transmit light emitted from the at least one light source into light emitted from the array of LEDs.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A luminaire comprising
an array of LEDs comprising at least one LED selected from the group consisting of blue LED, green LED, red LED, yellow LED, amber LED, cyan LED, and white LED,
a reflecting tube having an entrance aperture, an exit aperture, a reflective circumferential wall extending between said apertures, and an optic axis extending between said apertures centrally of said wall, said array of LEDs being arranged in said entrance aperture, said circumferential wall being arranged to reflect and mix light from said array of LEDs,
at least one light source arranged circumferentially around, outside of and separate from said reflecting tube, wherein the at least one light source comprises at least one LED selected from the group consisting of deep blue LEDs, royal blue LEDs, deep red LEDs and UV LEDs, and
at least one optical component arranged to transmit light emitted from the at least one light source into light emitted from the array of LEDs.

2. The luminaire according to claim 1, wherein said optical component is an X-cube arranged at the exit aperture such that light emitted from the at least one light source is directed into light emitted from the array of LEDs.

3. The luminaire according to claim 1, wherein said optical component is a dichroic mirror which is integral in said wall, transparent to light emitted from the at least one light source and reflective to light emitted from said array of LEDs.

4. The luminaire according to claim 3, wherein the dichroic mirror is arranged closer to the entrance aperture than to the exit aperture.

5. The luminaire according to claim 3, wherein the at least one light source is arranged in a mixing box.

6. The luminaire according to claim 3, wherein light emitted from the at least one light source is arranged to be directed to the at least one dichroic mirror via a mirror.

7. The luminaire according to claim 1, wherein said at least one optical component is a light guide having an entrance aperture and an exit aperture, wherein the entrance aperture is coupled to the at least one light source, wherein the exit aperture of the light guide is a dichroic mirror which is transparent to light emitted from the at least one light source and reflective to light emitted from said array of LEDs, and wherein the exit aperture of the light guide is integral in said wall.

8. The luminaire according to claim 1, wherein said at least one optical component is a light guide having an entrance aperture and an exit aperture, wherein the entrance aperture is coupled to the at least one light source, and wherein the exit aperture is arranged in said array of LEDs.

9. The luminaire according to claim 1, wherein said circumferential wall is at least one from the group of specularly reflective, and diffusively reflective.

10. The luminaire according to claim 1, wherein said circumferential wall diverges from said entrance aperture to said exit aperture.

11. The luminaire according claim 1, wherein said circumferential wall, seen from said optic axis, has a convex shape.

12. The luminaire according claim 1, wherein said array of LEDs and said at least one light source are arranged on separate PCBs.

13. The luminaire according to claim 12, wherein LED:s arranged at the separate PCBs are comprised of InGaN LEDs or AlInGaP LEDs.

14. The luminaire according to claim 13, wherein the at least one optical component has a transition from reflective to transmissive between 550 and 590 nm.

* * * * *